United States Patent [19]

McMurtry

[11] Patent Number: 4,536,661
[45] Date of Patent: Aug. 20, 1985

[54] POSITION-SENSING APPARATUS

[75] Inventor: David R. McMurtry, Wotton-Under-Edge, England

[73] Assignee: Renishaw plc, Wotton-Under-Edge, England

[21] Appl. No.: 619,157

[22] PCT Filed: Oct. 17, 1983

[86] PCT No.: PCT/GB83/00263
§ 371 Date: Jun. 8, 1984
§ 102(e) Date: Jun. 8, 1984

[87] PCT Pub. No.: WO84/01621
PCT Pub. Date: Apr. 26, 1984

[30] Foreign Application Priority Data
Oct. 15, 1982 [GB] United Kingdom ............... 8229594

[51] Int. Cl.³ ........................ G01B 7/02; G01B 7/12
[52] U.S. Cl. ........................ 307/119; 33/169 C; 33/561
[58] Field of Search .............. 307/119, 120, 121, 122; 33/174 L, 169 C, 172 D, 172 E; 340/568, 669, 672, 686

[56] References Cited
U.S. PATENT DOCUMENTS
4,145,816  3/1979  Stobbe et al. ............... 33/174 L
4,339,714  7/1982  Ellis ........................... 324/207

OTHER PUBLICATIONS
German Laid-Open Offenlegungsschrift 2 042 506 published Mar. 2nd, 1982.
British Patent Specification 819,417 published Sep. 2nd, 1959.

Primary Examiner—A. D. Pellinen
Assistant Examiner—Todd E. DeBoer
Attorney, Agent, or Firm—Spencer & Frank

[57] ABSTRACT

A machine tool spindle (10), rotatable in a housing (11), is adapted to receive, as an alternative to a cutting tool, a probe (12) having a stylus (14) whereby to sense a workpiece (15) for the purpose of measuring it. On sensing the workpiece (15) the probe (12) generates a signal which is transmitted to a fixed location (X) on the housing (11). The probe (12) has a body (13) secured to the spindle (10) for rotation therewith, such rotation being required for certain measuring manouvres. To cope with the transmission of the signal (17) from the rotating probe (12) to the fixed location (X), the signal (17) is transmitted through the intermediary of a sleeve (19) supported on the probe body (13) such that the body (13) can rotate while the sleeve (19) is held still by an axially disengageable mechanical connector (21) connecting the sleeve (19) to the housing (11). The transmission of the signal (17) takes place through a rotation-accommodating first inductive coupling (28) between the probe body (13) and the sleeve (19), and by a rotationally fixed but axially disengageable second inductive coupling (30) between the sleeve (19) and the housing (11). The probe and sleeve assembly (12,19) is connectable to and disconnectable from the spindle (10) by a transfer mechanism (24). The connector (21) and the second coupling (30) are engaged and disengaged accordingly. The assembly (12,19) may include a duct (31) for transmission of a cleaning fluid from the housing (11) to the sensing end (14A) of the stylus (14).

7 Claims, 3 Drawing Figures

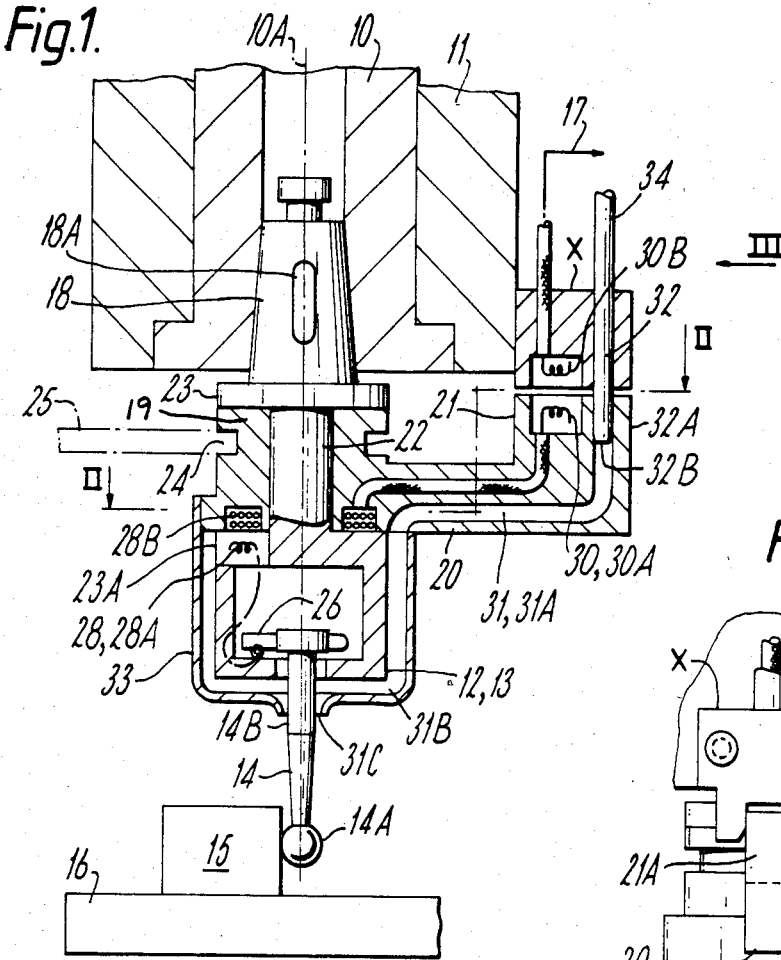
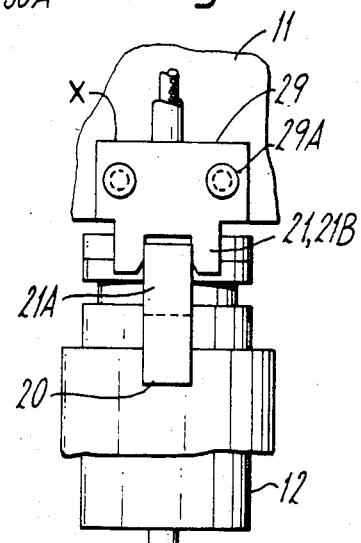
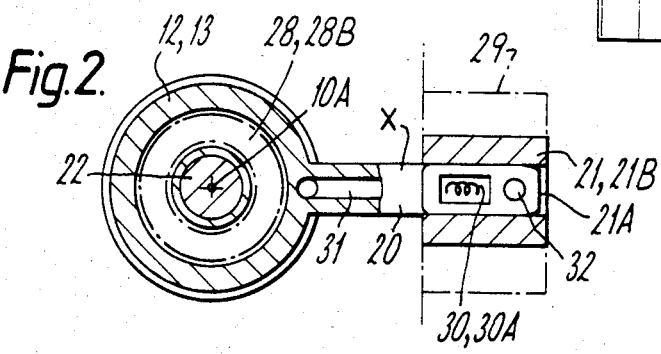

POSITION-SENSING APPARATUS

BACKGROUND OF THE INVENTION

This invention relates to position-sensing apparatus. It is known, e.g. in numerically controlled machine tools, to provide a spindle having an axis of rotation, a support structure supporting the spindle for rotation, a probe having a body secured to the spindle for rotation therewith about said axis, the probe further having means for sensing an object, means for generating a signal responsive to such sensing, and external transmission means for transmitting the signal from said body to a location provided on said support structure at a given angular position about said axis. Said angular position is so selected that the external transmission means does not foul other equipment present on the support structure. However, it is often desirable to rotate the probe by rotating the spindle, e.g. for the purpose of a particular measuring manouvre. In the past such rotation was not possible because of the selected angular position of said location.

BRIEF SUMMARY OF THE INVENTION

The present invention overcomes the above difficulty by the provision of a sleeve supported on said body for relative rotation therebetween about said axis but against relative axial movement, connector means connecting said sleeve to said support structure against rotation relative thereto but allowing axial release therefrom together with release of said body from said spindle, internal transmission means for transmission of said signal between said body and said sleeve while accommodating relative rotation therebetween, and wherein said external transmission means is arranged for transmission of said signal between said sleeve and said location.

BRIEF DESCRIPTION OF THE DRAWING

A preferred embodiment of the invention is described in detail, and by way of example, hereinbelow with reference to the accompanying drawing wherein:-

FIG. 1 is a sectional elevation of the tool spindle of a numerically controlled machine tool, FIG. 2 is a section on the line II-II in FIG. 1, and FIG. 3 is a part view in the direction of the arrow III in FIG. 1.

DETAILED DESCRIPTION OF THE PREFERRED EMBODIMENT

The spindle, denoted 10, is mounted for rotation about its axis 10A in a stationary support structure or bearing housing 11. As an alternative to the usual cutting tool, the spindle 10 has secured thereto a position-sensing probe 12 having a probe body 13 supporting a stylus 14 whereby to engage a workpiece 15 for the purpose of sensing the position thereof. The workpiece 15 is supported on a table 16 which is measurably movable relative to the spindle 10. The probe is adapted to output a probe signal 17 responsive to engagement between the stylus and the workpiece during movement of the table 16. The probe signal 17 has to be transmitted to the bearing housing 11 for further transmission to a control system (not shown) adapted to determine the position of the table, and thus of the workpiece, at the instant of the probe signal 17. The probe 12 is connected to the spindle 10 by a taper member 18 and is removable from the spindle 10 in the direction of the axis 10A.

A sleeve 19 supported on the probe body 13 includes a radial arm 20 connected to the housing 11 by an axially releasable mechanical connector 21 comprising an axially directed first element 21A provided on the arm 20 and a second element or recess 21B provided on the housing 11 for engagement by the element 21A. The connector 21 supports the sleeve 19 against rotation but permits axial withdrawal of the sleeve 19 from the housing 11. The probe body 13 has a journal 22 on which the sleeve 19 is supported in a manner permitting rotation of the body 13 about the axis 10A while the sleeve 19 stands still. Shoulders 23, 23A on the body 13 prevent axial motion of the sleeve 19 relative thereto. The sleeve 19 has an annular groove 24 for engagement of the probe by a tool mechanism 25 whereby the probe and sleeve assembly 12, 19 can be axially removed from or inserted into its position on the spindle 10. The arm 20 is so positioned relative to a drive key 18A on the taper member 18 that when the probe is inserted into the spindle by the mechanism 25 the element 21A registers with the recess 21B.

The probe signal 17 is generated by the breaking of electric contacts 26 when, on engagement between the stylus 24 and the workpiece 15, the stylus is displaced by a small amount relative to the probe body 13. The contacts 26 are arranged in an electric circuit 27 connected to an internal transmission means defined by a first inductive coupling provided between the body 13 and the sleeve 19. The coupling 28 has a first coil 28A mounted circumferentially locally on the body 13 and a circumferentially continuous coil 28B mounted on the sleeve 19 so that the signal is transmittable by the coupling 28 regardless of the relative angular position of the body 13 and the sleeve 19. The diameter of the coil 28B is determined by the relatively small diametral dimension of the body 13 and it therefore does not interfere with surrounding structure. For transmission of the signal 17 between the sleeve 19 and the housing 11 there is provided an external transmission means defined by a second coupling 30 situated at the outside of the housing 11 and comprising two local coils 30A, 30B provided respectively at the elements 21A, 21B of the connector 21.

The connector 21 and the coupling 30 are situated at a selected angular location X about the axis 10A while permitting rotation of the probe body 13 relative to the housing 11. If the arm 20 were secured to the body 13, the arm 20 would inevitably participate in the rotation of the body 13 and the coupling 30 would require a circumferentially continuous coil, such as the coil 28B, provided on the housing 11. This would require space which is not often available at the adjacent end of the housing 11. This problem arises especially in machine tools which are designed originally for the use of tools only and where the probe facility is introduced at a later stage as a so-called "retrofit" and, it will be clear, the invention overcomes this difficulty. In a modification, not illustrated, the inductive coupling 28 is replaced by a slip ring coupling. In a further modification, not illustrated, the inductive coupling 30 is replaced by an opto-electronic coupling.

The probe and sleeve assembly 12,19 may include a fluid flow duct 31 leading from a fluid flow supply tube 34 mounted on the housing 11 to an opening 31C annularly surrounding the stylus 24 at a part 24B thereof adjacent the body 13. The opening 31C is directed along the stylus 14 toward a work-contacting end 14A thereof. Fluid such as compressed air or a liquid tool coolant is supplied to the duct 31 to be directed onto the end 14A of the stylus 14 to keep the end 14A clean. The duct 31 is provided on the sleeve 19 and comprises a duct portion 31A in the arm 20 connected to the supply tube 34 by a fluid flow connector 32 having a socket 32A provided on the element 21A and engaged by a plug 32B provided at the element 21B. The duct portion 31A leads to a shroud 33 secured to the sleeve 19 and surrounding the body 13. A clearance 31B between the body 13 and the shroud 33 forms part of the duct 31 and leads to the outlet opening 31C.

Preferably the element 21B of the connector 21 and the element 30B of the coupling 30 are embodied in a mounting member 29 adapted to be secured to the housing at the location X by screws 29A. Thus, when a matching not having a probing facility is to be equipped with such a facility, it is merely necessary to supply the mounting member 29 along with the assembly 12,19. The latter assembly is connectable to the spindle 10 by means of the taper member 18, or an equivalent means, in the same way as the usual cutting tools, and the mounting member 29 is readily secured to the housing 11 by a simple fitting operation.

I claim:

1. Position-sensing apparatus comprising a spindle (10) having an axis of rotation (10A), a support structure (11) supporting the spindle (10) for rotation, a probe (12) having a body (13) releasably secured to the spindle (10) for rotation therewith, the probe (12) further having means (14) for sensing an object (15), means (26) for generating a signal (17) responsive to such sensing, and external transmission means (30) for transmitting the signal (17) from said body (13) to a locaton (X) provided on said support structure (11) at a given angular position about said axis (10A), characterised by a sleeve (19) supported on said body (13) for relative rotation therebetween about said axis but against relative axial movement, connector means (21) connecting said sleeve (19) to said support structure (11) against rotation relative thereto but allowing axial release therefrom together with release of said body (13) from said spindle (10), internal transmission means (28) for transmission of said signal (17) between said body (13) and said sleeve (19) while accommodating relative rotation therebetween, and wherein said external transmission means (30) is arranged for transmission of said signal (17) between said sleeve (19) and said location (X).

2. Apparatus according to claim 1 wherein said internal transmission means (28) comprises a coupling (28) having a first coupling element (28A) provided on one of said body (13) and said sleeve (19) and adapted to cooperate with a circumferentially continuous second coupling element (28B) provided on the other one of said body (13) and said sleeve (19) for transmission of said signal (17) so that on relative rotation of said body (13) and said sleeve (19) transmission is maintained between said elements (28A,28B).

3. Apparatus according to claim 1 wherein said connector means (21) comprises a mechanical connector (21) having axially engageable and disengageable connector elements (21A,21B) provided respectively on said sleeve (19) and on said support structure (11).

4. Apparatus according to claim 3 wherein said external transmission means (30) comprises a coupling (30) having first and second coupling elements (30A,30B) provided at the respective elements (21A,21B) of said mechanical connector (21).

5. Apparatus according to claim 1 wherein said probe (12) includes a stylus (24) extending from said body (13) and having a work-contacting end (24A), said sleeve (19) includes a fluid flow duct (31), a fluid flow connector means (32) is provided between said sleeve (19) and said support structure (11) for transmitting fluid from said support structure (11) to said duct (31), and said duct (31) has an outlet (31C) directed onto sad work-contacting end (24A).

6. Apparatus according to claim 1 wherein said connector means (21) comprises a mechanical connector (21) having axially engageable and disengageable connector elements (21A,21B) provided respectively on said sleeve (19) and on said support structure (11), and a fluid flow connector means (32) comprises fluid flow connector elements (32A,32B) provided at said elements (21A,21B) of the mechanical connector (21).

7. Apparatus according to claim 5 wherein said fluid flow duct (31) comprises a shroud (33) surrounding said stylus (14) at a part (14B) thereof adjacent said body (13), and said outlet opening (31C) extends around said part (14B) and is directed toward said work-contacting end (14A) of the stylus (14).

* * * * *